United States Patent [19]
Fiedler et al.

[11] Patent Number: 5,961,037
[45] Date of Patent: Oct. 5, 1999

[54] ENGINE COOLANT THERMOSTAT WITH OVERTEMPERATURE PROTECTION

[75] Inventors: Robert L. Fiedler, Glen Ellyn; Richard L. Elkin, Schaumburg; William R. Brooks, Freeport; John E. Barrath, Glenview, all of Ill.

[73] Assignee: Eaton Corporation, Cleveland, Ohio

[21] Appl. No.: 09/070,400

[22] Filed: Apr. 30, 1998

[51] Int. Cl.⁶ ....................................................... F01P 7/16
[52] U.S. Cl. ........................................ 236/34.5; 236/93 A
[58] Field of Search ........................ 236/34, 34.5, 93 A, 236/99 J, 99 K, 100

[56] References Cited

U.S. PATENT DOCUMENTS

| | | | |
|---|---|---|---|
| 2,692,731 | 10/1954 | Farrar | 236/34 |
| 2,847,165 | 8/1958 | Freismuth | 236/34.5 |
| 2,873,070 | 2/1959 | Drapeau | 236/34 |
| 2,981,477 | 4/1961 | Salmon | 236/34 |
| 4,562,953 | 1/1986 | Duprez et al. | 236/34.5 |
| 5,018,664 | 5/1991 | Butler | 236/34.5 |

*Primary Examiner*—William E. Tapolcal
*Attorney, Agent, or Firm*—Roger A. Johnston

[57] ABSTRACT

An engine coolant thermostat of the type having a thermally expansible wax power element acting against a diaphragm and piston to move a poppet. The poppet has a retainer attached thereto which has portions sliding in slots on the thermostat housing; and these portions contact the ends of the slots to limit piston travel in the event of exposure to overtemperature and prevent failure of the thermostat.

18 Claims, 2 Drawing Sheets

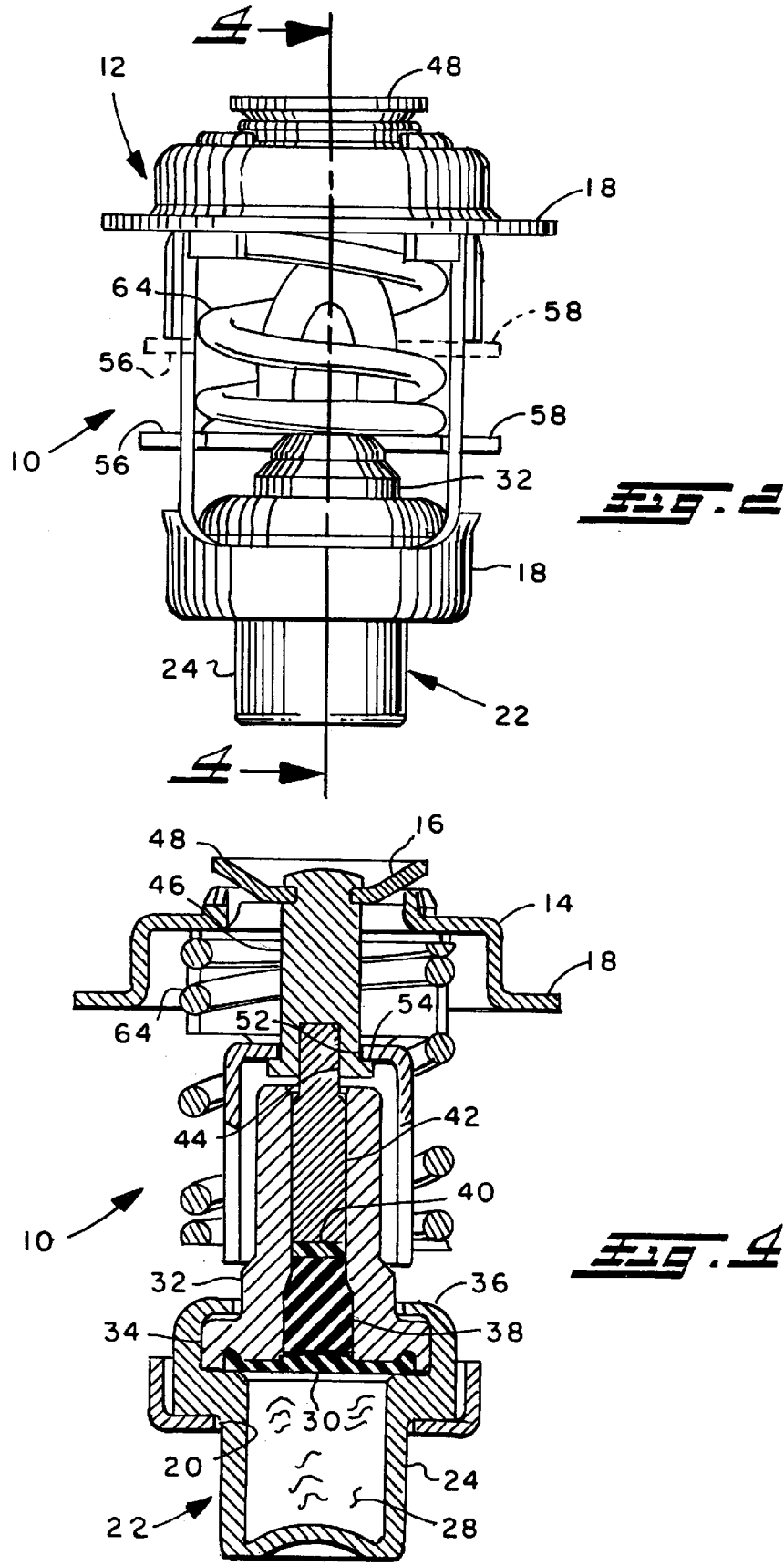

ENGINE COOLANT THERMOSTAT WITH OVERTEMPERATURE PROTECTION

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to thermally responsive valves for thermostats intended for use in controlling flow of coolant in an internal combustion engine. In particular, the present invention relates to thermostats in engines operated under fully loaded conditions and which may at times be subject to overheating.

Engine thermostats or thermally responsive coolant flow control valves typically employ a thermally responsive element which utilizes thermally expansible wax in a cup which is sealed by a rubber diaphragm and rubber plug. Upon expansion of the wax at a critical temperature, the volume of the wax increases dramatically and the diaphragm forces the plug to act against an output member which opens the poppet or valve member of the thermostat which is initially closed against an annular valve seat.

When thermostats employing such a thermally expansible wax filled power element for the thermal sensor are exposed to overtemperatures on the order of 400° Fahrenheit, the extreme expansion of the wax material causes the piston to pop out of the guide or bind, and also causes the spring retainer to block adequate flow of coolant, and thus the thermostat fails in service.

Accordingly, it has been desired to provide a way or means of preventing excessive movement of the operating member of a expansible wax powered engine coolant thermostat upon exposure to overtemperature in a manner which is simple and low in manufacturing cost and requires minimum redesign and/or tooling changes in currently mass-produced thermostats.

BRIEF SUMMARY OF THE INVENTION

The present invention provides a solution to the above-described problem of failure of an engine thermostat employing a thermally expansible wax power element upon exposure to overtemperature.

The thermostat of the present invention employs a spring retainer received over the output member of the power element which contacts the poppet for effecting opening movement thereof, with the spring retainer having outwardly extending tabs which engage slots formed in the thermostat housing. Upon the power element experiencing overtemperature, the increased movement of the output member and spring retainer causes the tabs to engage the ends of the slots thereby limiting movement of the output member and further deflection of the diaphragm and the power element.

The spring retainer with tabs and the slots in the housing may be simple modifications to existing production parts; and, the present invention thus provides a low cost solution to the problem of protecting an existing production thermostat against overtemperature.

BRIEF DESCRIPTION OF THE DRAWINGS

FIG. 3 is a section view taken along section indicating lines 3—3 of FIG. 1; and, FIG. 4 is a section view taken along section indicating lines 4—4 of FIG. 2.

DETAILED DESCRIPTION OF THE INVENTION

Figure 1:
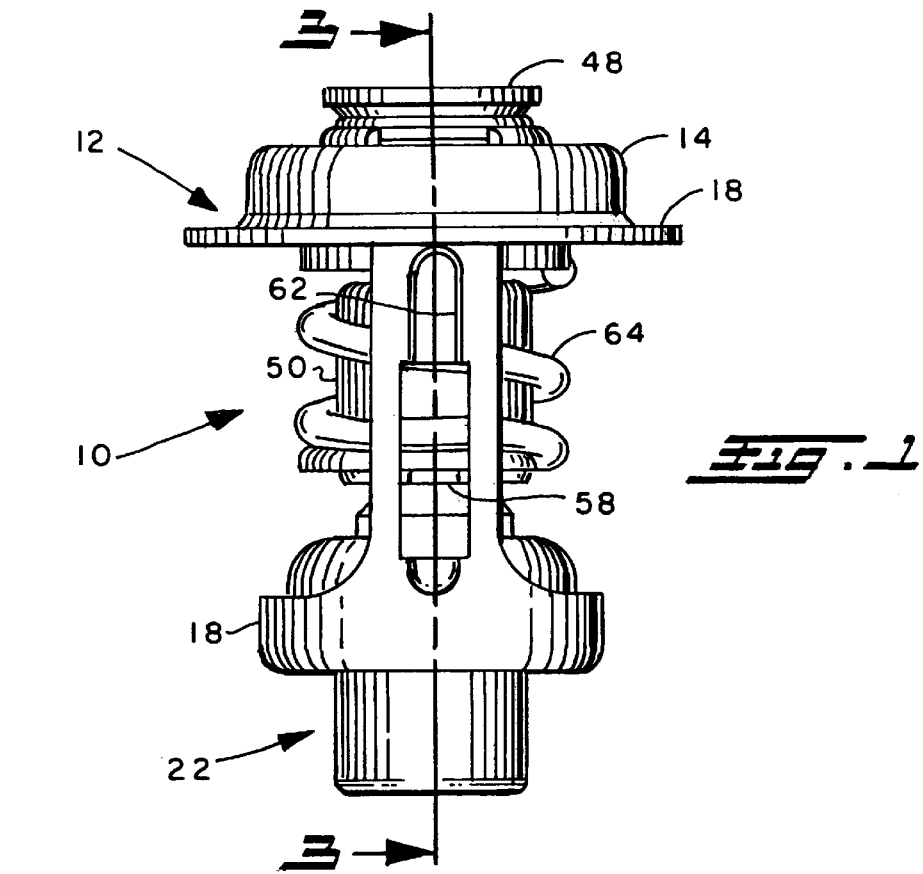
FIG. 1 is a front elevation view of the thermally responsive valve assembly of the present invention.

Referring to the drawings, the thermally responsive valve assembly of the present invention is indicated generally at 10 and includes a housing indicated generally at 12 having a mounting portion 14 with an annular valve seat 16 and an outwardly extending mounting flange 18. The housing 12 has a downwardly extending extension member 18 having a generally U-shaped configuration and which has an aperture 20 formed therein. A thermally responsive power element indicated generally at 22 has a cup portion 24 received through the aperture 20 with the shoulder 26 registered against the surface of the extension 18 surrounding aperture 20. The cup 24 is filled with thermally expansive wax material 28 which may be filled with metallic powder or flakes in a manner well known in the art and is sealed by a diaphragm 30 which is retained by a sleeve 32 having an enlarged flange 34 which bears against the diaphragm, with the flange 34 secured in the power element by a crimp or rollover 36. The sleeve 32 has elastomeric plug 38 disposed therein with the lower end thereof in contact with the central region of the upper surface of the diaphragm 30 and the upper end of plug 38 is in contact with a backing disk 40 which has its upper surface in contact with an output member 42 which has its upper end piloted in a bore 44 provided in the lower end of a poppet member 46 which has an outwardly extending head portion 48 which registers against the valve seat 16 in the closed position as shown in FIG. 3 and is spaced from the valve seat in the open position.

A spring retainer 50 has an aperture 52 formed therein which is received over the poppet 46 and registered against a shoulder 54 provided thereon. The retainer 50 has a generally cup-shaped configuration or U-shape in cross section and has outwardly extending tabs or flanges 56, 58 provided on the open end thereof which tabs slidably engage a pair of oppositely disposed elongated slots 60, 62 formed in the extension portion 18 of the housing.

Figure 2:
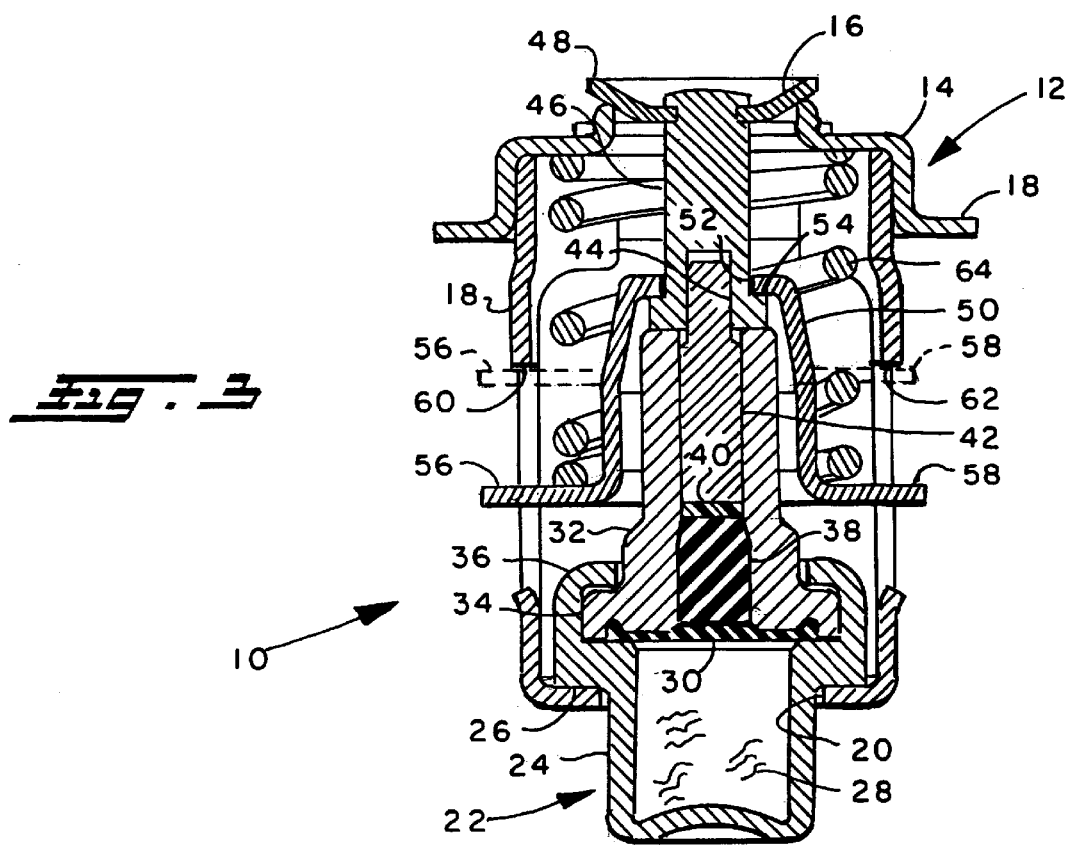
FIG. 2 is a side elevation view of the valve assembly of FIG. 1.

A valve closing spring has the upper end thereof registered against the undersurface of mounting portion 14 in the lower end thereof registered against the tabs 56, 58 for urging the poppet 46 in the closed direction and is compressed to provide a desirable preload. In operation, as the engine coolant transfers heat to power element 22, the wax 28 expands causing the diaphragm, plug 38 and output member 42 to raise the poppet head 48 from seat 16 by overcoming the bias force and further compressing spring 64. In the event of overtemperature, the tabs 56, 58 are moved to the position shown in dashed outline in FIGS. 2 and 3 and in contact with the upper end of the slots 60, 62, respectively which thereby limits the movement of the retainer 50, output member 42 and poppet 46.

The present invention thus provides a low cost way of modifying an existing production thermostat employing a thermally expansible wax power element and preventing the piston from popping out or adequate flow of coolant from being blocked by the spring retainer. It thus provides a functional unit after exposure to overtemperature up to about 400° Fahrenheit for a limited number of such exposures.

Although the invention has hereinabove been described with respect to the illustrated embodiments, it will be understood that the invention is capable of modification and variation and is limited only by the following claims.

We claim:

1. A thermostatically operated valve for controlling flow of engine coolant comprising:
   (a) a housing having a mounting portion adapted for mounting in an engine coolant flow passage and including an annular valve seat and an extension portion defining a plurality of stop surfaces;
   (b) a poppet disposed for movement between a closed position on said seat and an open position away from said seat;
   (c) a thermally responsive element (TRE) disposed on said extension portion distal said valve seat and including an operating member extending therefrom and operatively contacting said poppet for effecting movement of said poppet between said open and closed positions
   (d) retaining member associated with said poppet and having a pair of oppositely directed outwardly extending portions with each of said pair of portions operative upon exposure of said TRE to overtemperature conditions, to contact stop surfaces for limiting opening movement of said poppet and operating member.

2. The valve described in claim 1, wherein said TRE includes thermally expansible wax material.

3. The valve described in claim 1, wherein said retaining member comprises a generally U-shaped member with the ends thereof each comprising one of said guide portions.

4. The valve described in claim 1, wherein said pair of guide surfaces comprises a pair of elongated slots.

5. The valve described in claim 1, wherein said means operable for biasing said poppet comprises a coil spring.

6. The valve described in claim 1, wherein said housing mounting portion comprises an annular flange concentric with said valve seat.

7. The valve described in claim 1, wherein said means operable for biasing said poppet includes a coil spring having one reaction end registered against said housing mounting portion and an opposite reaction end registered against said guide portions of said stop member.

8. A method of limiting opening of a thermostatic valve comprising:
   (a) disposing a poppet for movement with respect to an annular valve seat on a housing;
   (b) disposing a thermally responsive element distal said poppet and moving the poppet in response to temperature changes sensed by the element;
   (c) disposing a retaining member for movement with said poppet and applying a bias force to said retaining member and urging said poppet to the closed position;
   (d) configuring stops on said housing and contacting said stops with said retainer and limiting movement of said poppet and operating member in the poppet opening direction.

9. The method defined in claim 8, wherein said step of limiting includes forming a pair of spaced generally parallel slots in the housing and slidably engaging said stop member in said slots.

10. The method defined in claim 8, wherein said step of applying a force and urging include compressing a helical spring.

11. The method defined in claim 8, wherein said step of configuring stops includes forming a pair of spaced generally parallel slots and disposing the ends of the slots for contact by the retaining member.

12. The method defined in claim 8, wherein said step of disposing a retaining member includes disposing a generally U-shaped member over said poppet.

13. The method defined in claim 8, wherein said step of configuring stops includes forming a pair of spaced generally parallel slots in said housing and slidably engaging said slots with said retaining member.

14. A thermostatically operated valve for use in controlling flow of engine coolant comprising:
   (a) a housing having a mounting portion adapted for mounting in an engine coolant flow passage and including an annular valve seat and an extension portion extending from said mounting portion in a direction generally perpendicular to said valve seat, said housing defining stop surfaces thereon;
   (b) a valve member disposed for movement between a closed position on said seat and an open position away from said seat;
   (c) a thermally responsive element (TRE) disposed on said extension portion distal said valve seat and including an operating member extending therefrom and operatively contacting said poppet between said open and closed positions;
   (d) a retainer associated with said poppet, said retainer having portions thereof operative to contact said stop surfaces for limiting movement of said poppet and operating member; and,
   (e) a spring having one reaction end contacting said housing and another reaction end contacting said retainer for biasing said poppet to the closed position.

15. The valve defined in claim 14, wherein said TRE includes thermally expansible wax material.

16. The valve defined in claim 14, wherein said retainer has a generally U-shaped configuration with the ends of said U-shape contacting said stop surfaces.

17. The valve defined in claim 14, wherein said housing stop surfaces comprise the ends of a pair of elongated slots.

18. The valve defined in claim 14, wherein said retainer has a generally U-shaped configuration; and said stop surfaces comprise the ends of a pair of elongated slots, wherein the ends of said U-shape each extend into one of said slots.

* * * * *